United States Patent

Miyake

(10) Patent No.: US 7,058,232 B1
(45) Date of Patent: Jun. 6, 2006

(54) IMAGE PROCESSING APPARATUS, METHOD AND MEMORY MEDIUM THEREFOR

(75) Inventor: Nobutaka Miyake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 589 days.

(21) Appl. No.: 09/711,956

(22) Filed: Nov. 15, 2000

(30) Foreign Application Priority Data

Nov. 19, 1999 (JP) ................................ 11-330183

(51) Int. Cl.
G06K 9/00 (2006.01)
G06K 9/36 (2006.01)
G06K 9/46 (2006.01)
G06K 9/38 (2006.01)

(52) U.S. Cl. ................ 382/252; 382/100; 382/232; 382/251

(58) Field of Classification Search ............. 382/100, 382/251–252, 173, 151; 713/176, 307; 358/3.28, 358/3.03
See application file for complete search history.

(56) References Cited

U.S. PATENT DOCUMENTS

| 4,660,221 | A | * | 4/1987 | Dlugos ..................... 705/62 |
| 5,480,239 | A | * | 1/1996 | Kim et al. ............. 400/120.09 |
| 5,652,626 | A | | 7/1997 | Kawakami et al. |
| 5,821,986 | A | * | 10/1998 | Yuan et al. .............. 348/14.12 |
| 5,896,403 | A | | 4/1999 | Nagasaki et al. |
| 6,477,276 | B1 | * | 11/2002 | Inoue et al. ................ 382/232 |
| 6,529,506 | B1 | * | 3/2003 | Yamamoto et al. ......... 370/389 |
| 6,535,616 | B1 | * | 3/2003 | Hayashi et al. ............. 382/100 |
| 2001/0043341 | A1 | | 11/2001 | Shibahara et al. .......... 358/1.9 |
| 2003/0138126 | A1 | * | 7/2003 | Hashimoto ................. 382/100 |

FOREIGN PATENT DOCUMENTS

| EP | 0 707 410 A2 | 4/1996 |
| EP | 0 901 102 A2 | 3/1999 |
| EP | 0 913 989 A2 | 5/1999 |
| JP | 06 231466 | 8/1994 |
| JP | 7-123244 | 5/1995 |
| JP | 2640939 | 5/1997 |
| JP | 2777800 | 5/1998 |
| JP | 2833975 | 10/1998 |
| JP | 11 041446 | 2/1999 |

OTHER PUBLICATIONS

Jang, et al., "Segmentation Based Wavelet Coding of Digital Images," IEEE, 1996, pp. 1878-1881.*

Kundur, et al., "A Robust Digital Image Watermarking Method using Wavelet-Based Fusion," IEEE Signal Processing Society Oct. 1997 International Conference on Image Processing (ICIP'97), pp. 544-547.*

(Continued)

*Primary Examiner*—Jingge Wu
*Assistant Examiner*—Shefali Patel
(74) *Attorney, Agent, or Firm*—Fitzpatrick, Cella, Harper & Scinto

(57) ABSTRACT

The invention provides an image processing apparatus capable of embedding predetermined information in an image, the apparatus comprising input means for entering the image, division means for dividing the entered image into plural image areas, quantization means for quantizing the image areas divided by the division means, utilizing error diffusion method, and control means for controlling, in the unit of the image area, the quantization condition by the quantization means according to the predetermined information.

30 Claims, 14 Drawing Sheets

OTHER PUBLICATIONS

Nakamura et al., "A Unified Coding Method of Dithered Image and Text Data Using Micropatterns," IEEE, 1989, pp. 50-56.*

Tanaka et al., "Embedding Secret Information into a Dithered Multi-level Image," IEEE, 1990, vol. I of III, pp. 0216-0220.*

Tanaka et al., "Embedding the Attribute Information into a Dithered Image," Systems and Computers in Japan, vol. 21, No. 7, 1990, pp. 43-50.*

"An Adaptive Algorithm for Spatial Greyscale," R. W. Floyd and L. Steinberg, Proceedings of the Society for Information Display, vol. 17, No. 2, pp. 75-77, 1976.

* cited by examiner

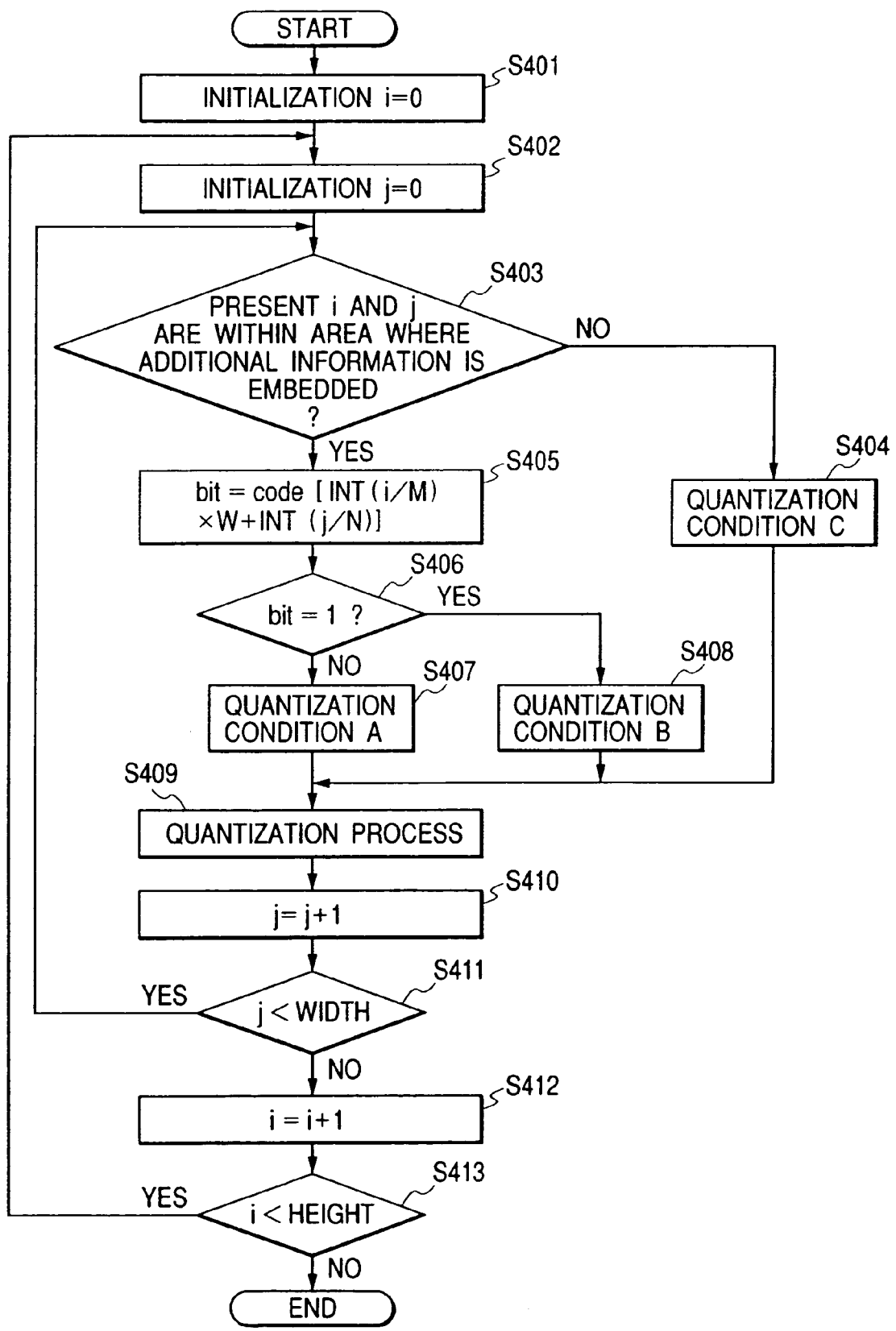

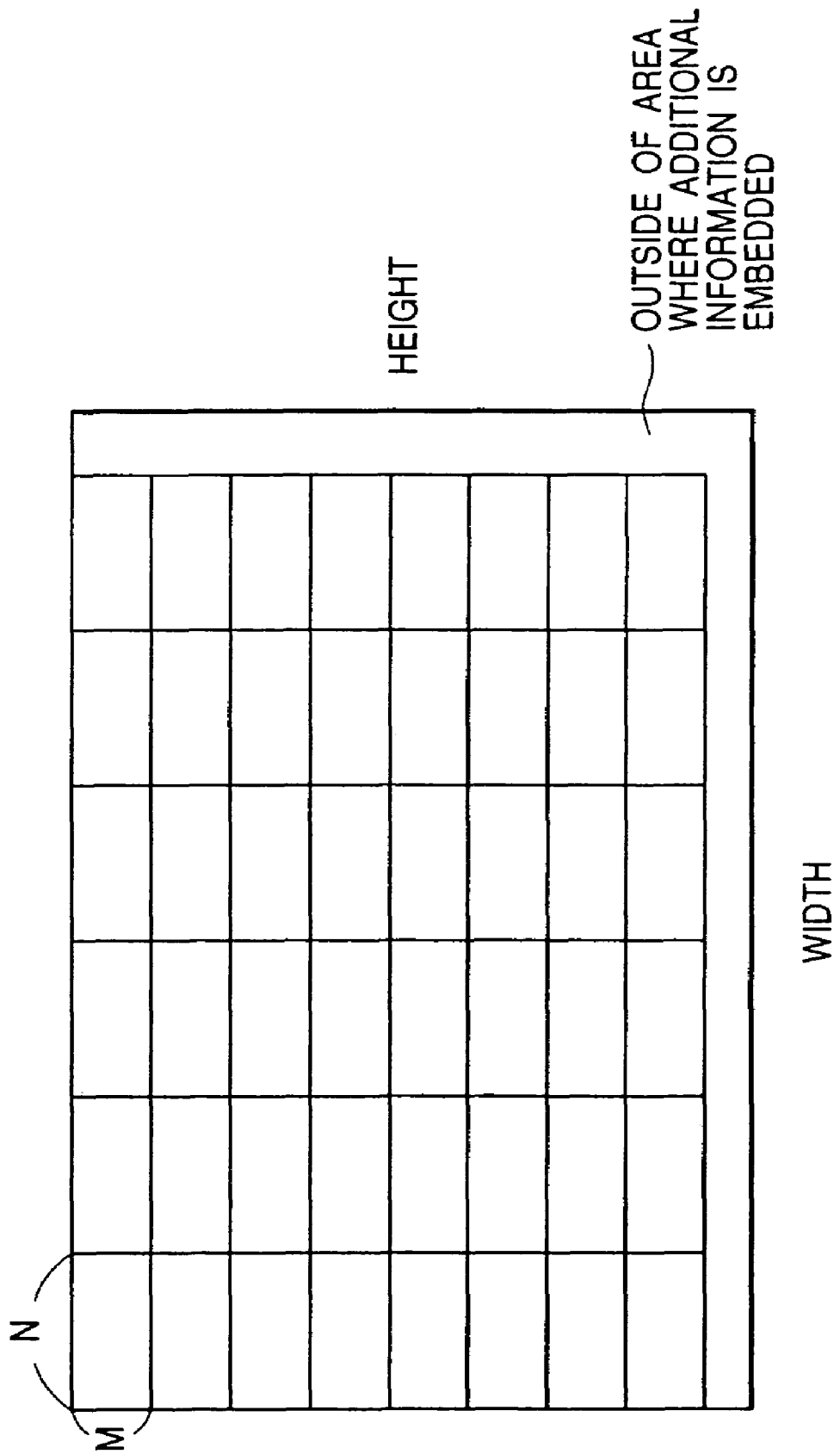

IMAGE PROCESSING APPARATUS, METHOD AND MEMORY MEDIUM THEREFOR

BACKGROUND OF THE INVENTION

1. Field of the Invention

The present invention relates to an image processing apparatus, an image processing method and a memory medium therefor.

2. Related Background Art

Recently there is being standardized the so-called digital watermarking technology for embedding, in image information such as a photograph or a picture, additional information consisting of so-called copyright information such as the name of author or the presence/absence of permission for use in visually easily unrecognizable manner for dissemination through networks such as internet.

Also with the progress in image quality of the copying apparatus and the printer, in order to avoid illegal forging of banknotes, stamps, valuable documents etc., there is known a technology of embedding additional information such as the information indicating the number of the output device in the image, in order to specify the output device and the number thereof from the image printed on paper.

For example, the Japanese Patent Application Laid-Open No. 7-123244 proposes a technology of embedding additional information in the high frequency range of the color difference component and saturation component which is of visually low sensitivity.

However, the above-described conventional technology has been associated with the following drawbacks. FIG. 13 illustrates embedding of general additional information in the digital watermarking technology. In the image information A, the additional information B is embedded by an adder 1301 to obtain multiplexed information C. FIG. 13 shows an example of embedding the additional information in the real space area of the image information. If such multiplexed information can be disseminated without image processing such as various filterings or encoding such as non-reversible compression, the additional information B can be easily extracted from the multiplexed information C even in the conventional technology. In the image information distributed on the internet, such extraction is possible through a digital filter for improving the image quality such as edge enhancement or smoothing, as long as there is certain noise resistance.

However, let us assume a case of printing the multiplexed image by an output device such as a printer and extracting the additional information from the print, employing a printer of representing ability of two to several gradation levels per color. Among the recent ink jet printers, there is known a device capable of representing several gradation levels by employing inks of lower dye concentration or variably controlling the output dot diameter, but the gradation of the photographic image cannot be reproduced unless pseudo gradation process is adopted.

Thus, in the aforementioned case of printer output of the multiplexed information employing the digital watermarking technology shown in FIG. 13, the multiplexed information C at first changes to quantized information D by a pseudo gradation process 1401 as shown in FIG. 14. Then the quantized information D changed, by printing on paper by a printer 1402, to significantly deteriorated on-paper information (print) E. Consequently, the aforementioned extraction of the additional information from the on-paper information for the purpose of preventing forgery corresponds to the extraction of the additional information B from the on-paper information E after the processes shown in FIG. 14.

As the information is significantly changed by the processes 1401, 1402, it is very difficult to embed the additional information in visually easily unrecognizable manner and to correctly extract the embedded information from the information on paper.

Also FIG. 15 shows an example of conventional digital watermarking technology the image information is synthesized for example to a high frequency range after conversion into a frequency range for example by Fourrier transformation instead of the real space area. In the example shown in FIG. 15, the image information is converted into the frequency range by an orthogonal transformation process 1501, and the additional information is added to a visually easily unrecognizable specified frequency by an adder 1502.

After the image information is returned to the real space area by an inverse orthogonal transformation process 1503, there is executed a filtering process involving major changes such as the pseudo gradation process and the printer output as in the case shown in FIG. 14.

FIG. 16 shows a procedure of separation of the additional information from the information on paper. The information of the print is entered by passing the print through an image reading device 1601 such as a scanner. As the printed image has the gradation by the pseudo gradation process, the entered information is subjected to a gradation reconstruction process 1602 which is an inverse pseudo gradation process. The gradation reconstruction process is generally executed with an LPF (low-pass filter). The information after the reconstruction is subjected to an orthogonal transformation process 1603 and the embedded additional information is separated by the power of a specified frequency in a separation process 1604.

As will be apparent from FIGS. 15 and 16, there are involved a number of complex processes from the embedding of the additional information to the extraction thereof. In case of a color image, there is also involved a color conversion process for converting into the colors specific to the printer. In order to achieve satisfactory separation even after such complex processes, there is required to the insertion of a signal of a very high resistance. It is difficult to insert a highly resistant signal while maintaining the satisfactory image quality.

Also since the involved processes are many in number and complex, the process time required for embedding and extraction becomes very long.

Also in the process of the aforementioned Japanese Patent Application Laid-Open No. 7-123244 in which the additional information is embedded in the high frequency range, if the error diffusion method is employed in the subsequent pseudo gradation process, the additional information may be buried in the range of the texture generated by the error diffusion due to the characteristics of the high-pass filter specific to the error diffusion method so that the probability of failure in the extraction becomes very high. Also there is required a highly precise scanner device for the extraction.

Thus, the processes shown in FIGS. 14 and 15 are not adequate in case the pseudo gradation process is to be adopted. Stated differently, there is required an embedding process for the additional information, fully utilizing the characteristics of the pseudo gradation process.

Examples of a process capable of combining the embedding of the additional information and the redundancy of the pseudo gradation process are disclosed in the Japanese Patent Registrations Nos. 2,640,939 and 2,777,800.

The former is to mix data into the image signal, in binarization with a systematic dither process, by selecting one of the dither matrixes representing a same gradation.

However it is difficult to output a photographic high image quality in the systematic dither process, unless employing a printer of a high resolution with a very high mechanical precision, since even a slight aberration in the mechanical precision results in a low frequency noise such as lateral streaks which is easily recognizable on the paper.

Also if the dither matrix is changed periodically, the frequency distribution is distorted by a specified frequency generated by the regularly arranged dither pattern to detrimentally affect the image quality.

Also the gradation representing ability varies significantly according to the kind of the dither matrix. Particularly on paper, the area change rate for example by the overlapping of dots varies depending on the kind of the dither matrix, so that the density may fluctuate by the switching of the dither matrix even in an area where the image signal indicates a uniform density.

Also there may probably result erroneous extraction if the extraction is executed by estimating the dither matrix employed for binarization while the pixel values of the original image information is unclear.

On the other hand, the latter is to employ a color dither pattern process and to embed the additional information according to such color dither pattern. Also in such process, the deterioration of the image quality by switching is inevitable as in the former process.

Also in comparison with the former process, the latter process can embed the additional information of a larger amount, but results in a variation in the color hue resulting from the change in the arrangement of the color components, leading to a deterioration of the image quality particularly in the solid image area.

Also the extraction on paper is anticipated to become more difficult. In any case, these two processes depending on the change of the dither matrix are associated with the drawback that the extraction is difficult while the deterioration of image quality is considerably large.

Therefore, the present applicant already proposed a method capable, utilizing the texture generated by the error diffusion method, of artificially preparing a combination of the quantized values that cannot be generated in the ordinary pseudo gradation process, thereby embedding the additional information.

In this method, the image quality is visually not deteriorated since there is only involved a slight change in the shape of the texture. Also the density in the aerial gradation can be maintained by employing a method of changing the quantization threshold value in the error diffusion method, so that the additional information can be extremely easily embedded.

In the above-described method, however, it is necessary to distinguish whether the texture is artificial or not at the extracting operation. In the print on paper, the texture may not be satisfactorily reproduced by the displacement of image dot from the desired print position for example by an error in the dot placement.

Also in case of a color image, the additional information is embedded principally in a color component of lowest visual sensitivity, but the judgment of texture in the real space area is easily affected by other color components, so that the extraction of the additional information becomes difficult.

There is also known a method, as disclosed in the Japanese Patent Registration No. 2,833,975, of embedding in the image additional information of a very large information amount such as audio information. Such method is to convert the audio information into dot codes known as so-called two-dimensional bar codes and print such codes in a marginal area of the image or in the image itself.

In such method, however, the embedded dot codes deteriorate the aesthetic feature of the image since such dot codes are not embedded in a not easily recognizable manner in the image information.

Though there is described an example of embedding the codes with transparent paint in the image in order to achieve not easily recognizable embedding, such method not only requires transparent ink leading to an increase in the cost but also deteriorates the image quality of the output on paper.

SUMMARY OF THE INVENTION

In consideration of the foregoing, an object of the present invention is to provide an image processing apparatus, an image processing method and a memory medium therefor, capable of resolving at least any of the foregoing drawbacks.

Another object of the present invention is to provide an image processing apparatus, an image processing method and a memory medium therefor, capable of adding predetermined information to an image while suppressing the deterioration in image quality resulting from the addition of the predetermined information to the image and enabling precise extraction of the embedded information.

Still another object of the present invention is to provide an image processing apparatus, an image processing method and a memory medium therefor, enabling precise extraction of predetermined information from an image to which the predetermined information is added.

The foregoing objects can be attained, according to a preferred embodiment of the present invention, by an image processing apparatus adapted to add predetermined information to an image, comprising an input unit for entering the image, a division unit for dividing the entered image into plural image areas, a quantization unit for quantizing, by the error diffusion method, the image area divided by the division unit, and a control unit for controlling the quantizing condition by the quantization unit in the unit of each image area.

Also according to another preferred embodiment of the present invention, there is provided an image processing apparatus adapted to add predetermined information to an image, comprising an input unit for entering the image, a division unit for dividing the entered image into plural image areas, transformation means for executing orthogonal transformation on the image area divided by the division unit, a classification unit for classifying the image areas into plural classes according to the transformation process of the transformation unit, and an extraction unit for extracting the predetermined information based on a feature amount of each of the classified classes.

According to the present invention, there are further provided an image processing apparatus, an image processing method and a memory medium therefor with a novel function.

Still other objects of the present invention, and the features thereof, will become fully apparent from the following detailed description which is to be taken in conjunction with the accompanying drawings.

BRIEF DESCRIPTION OF THE DRAWINGS

FIG. 4 is a flow chart showing the sequence of a multiplexing unit including a quantization control unit;

FIG. 5 is a view showing an example of block formation;

DESCRIPTION OF THE PREFERRED EMBODIMENTS

Embodiment

Now the present invention will be clarified in detail by an embodiment thereof, with reference to accompanying drawings. The image processing apparatus in the present embodiment can be efficiently incorporated as a printer driver software or an application software in a computer for preparing image information to be outputted to a printer engine, but can also be incorporated as a hardware or a software in the main body of a copying apparatus, a facsimile apparatus or a printer.

Figure 1:
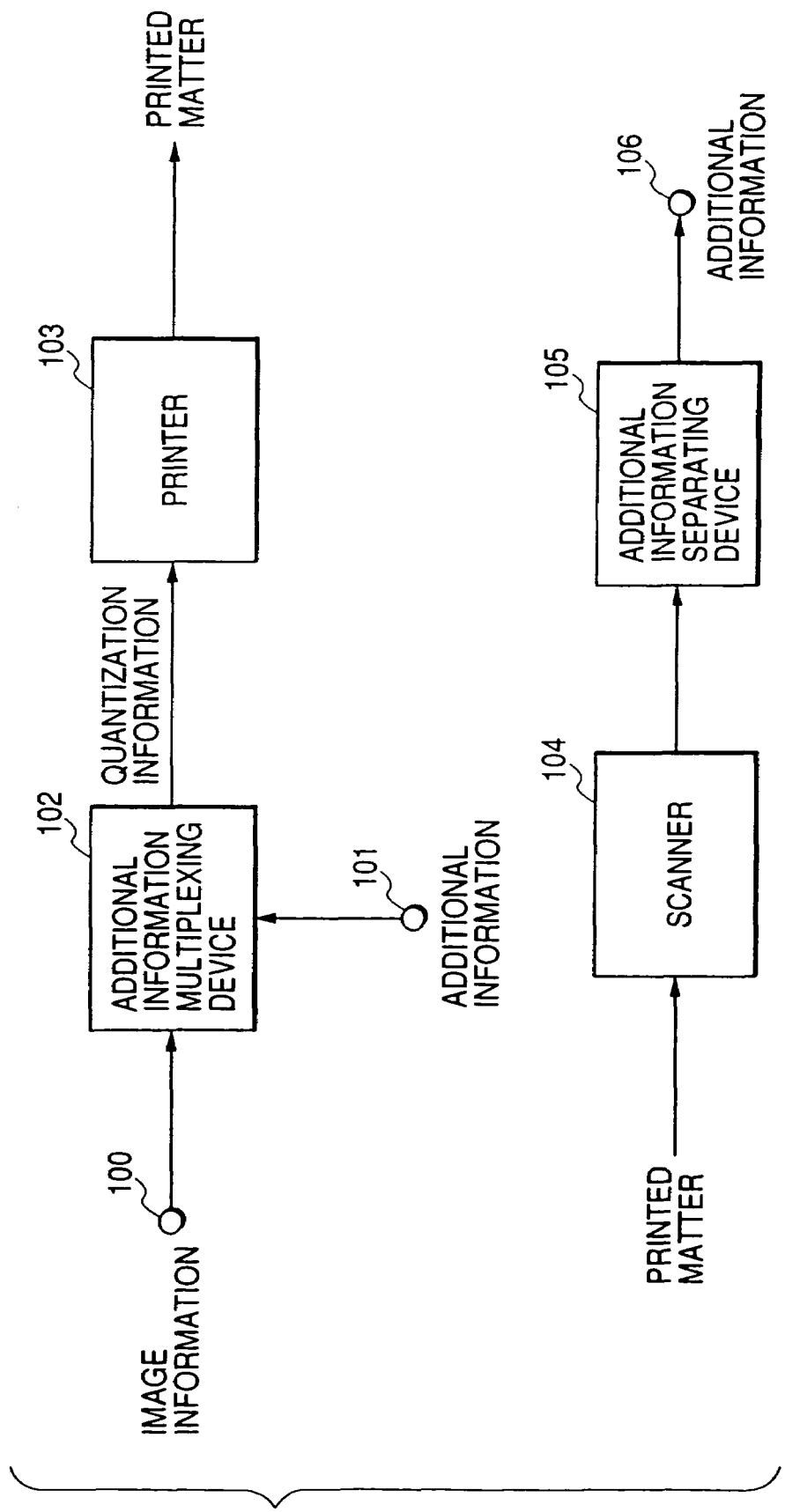
FIG. 1 is a block diagram showing the principal parts of an image processing system of the present invention.

FIG. 1 is a block diagram showing the configuration of an image processing system constituting a first embodiment.

Input terminals 100, 101 are respectively used for entering image information of multiple gradation levels, and additional information to be embedded in the image information.

Such additional information entered by input terminal 101 is different from the image information entered from the input terminal 100, and includes for example (i) audio information, (ii) text information, (iii) various information relating to the image entered by the input terminal 100 such as copyright, date and time of image taking, location of image taking, name of image taking person etc., or even (iv) completely different image information.

An additional information multiplexing device 102 serves to embed the additional information in the image information in a visually not easily recognizable manner. The additional information multiplexing device 102 executes quantization of the entered image information of multiple gradation levels in addition to the embedding of the additional information.

A printer 103 executes, by a printer engine, the output of the quantized information prepared by the additional information multiplexing device 102. The printer is assumed to be a printer capable of gradational represented by a pseudo gradation process, such as an ink jet printer or a laser printer.

The information on the output print is read by a scanner 104, and the additional information embedded in the print is extracted by an additional information extracting device 105 and is outputted to an output terminal 106.

Figure 2:
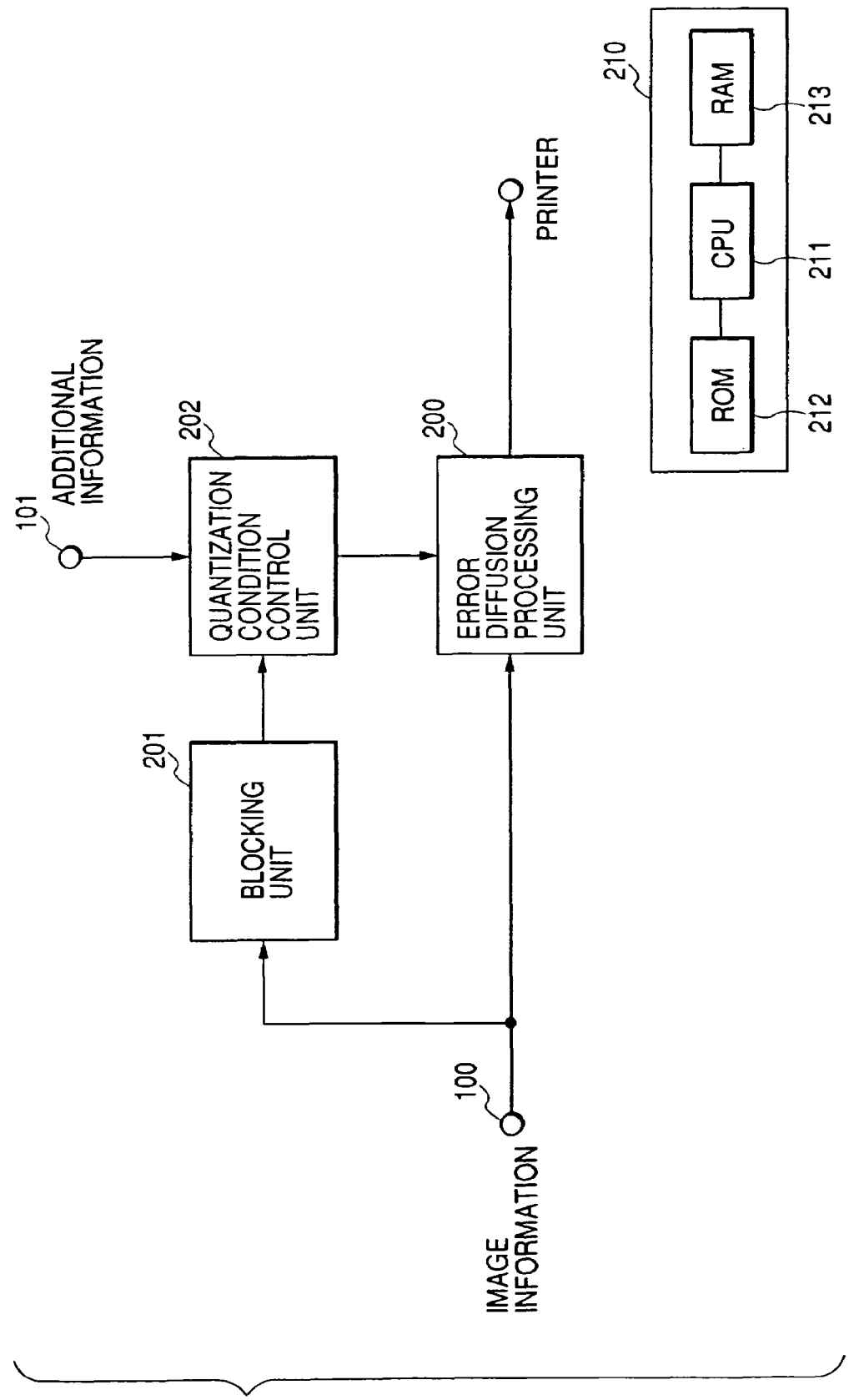
FIG. 2 is a block diagram showing an additional information multiplexing device showing in FIG. 1.

FIG. 2 is a block diagram showing the configuration of the additional information multiplexing device 102 shown in FIG. 1.

An error diffusion unit 200 executes a pseudo gradation process employing the error diffusion method on the entered image information to convert the number of gradation level thereof into a fewer number of quantization levels, in order to represent the gradation by area by the quantized levels of plural pixels. The details of the error diffusion process will be explained later.

A block forming unit 201 serves to divide the entered image information in the unit of a predetermined area. Such block may be rectangular or a non-rectangular area.

A quantization condition control unit 202 controls and changes the quantization condition in the unit of a block formed by the block forming unit 201. The quantization condition control unit 202 controls the quantizing condition based on the additional information entered from the input terminal 101.

A control unit 210 is composed for example of a CPU 211, a ROM 212 and a RAM 213. The CPU 211 controls the function of the aforementioned components and the process according to a control program stored in the ROM 212. The RAM 213 is used as a work area of the CPU 211.

Figure 3:
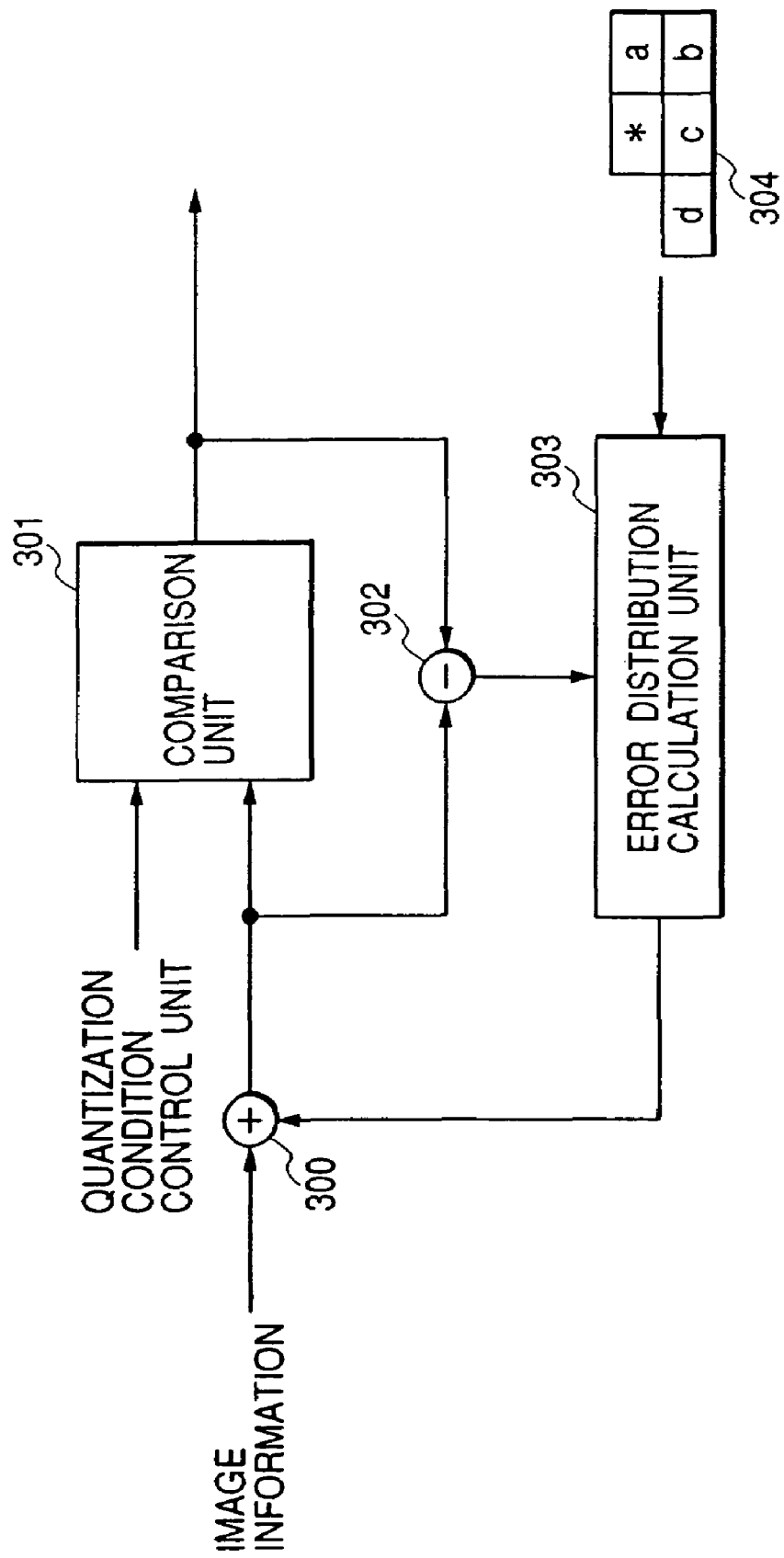
FIG. 3 is a block diagram showing the principal parts of an error diffusing unit shown in FIG. 2.

FIG. 3 is a block diagram showing the details of the error diffusion unit 200. The general error diffusion process is described in detail by R. Floyd and L. Stainberg in "An Adaptive Algorithm for Spatial Grayscale", SID Symposium Digest of Paper pp. 36–37 (1975).

The error diffusion process will be explained in the following, with an example where the quantization value is binary.

An adder 300 adds the pixel value of a contemplated pixel in the entered image information and a quantization error distributed from an already binarized peripheral pixel, and a comparison unit 301 compares the result of addition of the error with a quantization threshold value from the quantization condition control unit 202, and outputs "1" if the former is larger than the threshold value or "0" if otherwise.

In case of representing the gradation of a pixel for example with a precision of 8 bits, it is customary to represent the maximum value of the gradation levels by "255" and the minimum value by "0". It is assumed that a dot is printed (for example with ink, toner etc.) on the paper when the quantization value is "1".

A subtractor 302 calculates the error between the result of quantization and the aforementioned result of addition, and an error distribution calculation unit 303 distributes the error to the peripheral pixels which are to be subjected to the quantization process thereafter. The error is distributed according to a proportion recorded in an error distribution table 304 which is experimentally prepared in advance according to the relative distance to the contemplated pixel.

The distribution table 304 shown in FIG. 3 shows distribution to four surrounding pixels, but such example is not restrictive.

In the following there will be explained the operation sequence of the entire system including the quantization condition control unit 202, with reference to a flow chart shown in FIG. 4, in which explained is a case where the quantization value is binary.

A step S401 is the initialization of a variable i, which counts the address in the vertical direction.

A step S402 is the initialization of a variable j, which counts the address in the horizontal direction. A next step S403 is a discrimination step by the addresses values i, j and discriminates whether the coordinate of the current addresses i, j belongs to an area in which the additional information is to be embedded.

Now reference is made to FIG. 5 for explaining the area in which the additional information is to be embedded. FIG. 5 shows an image having a horizontal pixel number WIDTH and a vertical pixel number HEIGHT. It is assumed that the additional information is to be embedded in such image. The image is divided into blocks of N pixels in the horizontal direction and M pixels in the vertical direction, starting from an original point at the upper left corner of the image. In the first embodiment, the block formation is executed by taking the original point as a reference point, but it is also possible to adopt another reference point separate from the original point.

In order to embed the information as large as possible in the image, the blocks of N×M pixels each are arranged starting from the reference point. Thus, there are obtained following relations for the number W of the blocks that can be arrange in the horizontal direction and the number H of the blocks that can be arranged in the vertical direction:

| W = INT(WIDTH/N) | (1) |
| H = INT(HEIGHT/M) | (2) | wherein INT(x) indicates the integral part of x.

The numbers of pixels corresponding to the remainders in the relations (1) and (2) correspond to the marginal portion when the plural blocks of N×M pixels are arranged, and are outside the area of embedding of the additional information.

Again referring to FIG. 4, if the step S403 identifies that the currently processed pixel is outside the embedding area for the additional information, a step S404 sets a quantization condition C. On the other hand, if the currently processed pixel is identified inside the embedding area for the additional information, the additional information to be embedded is fetched. For the purpose of simplicity, it is assumed that the additional information is represented in each bit with an arrangement "code[ ]".

For example, if the additional information consists of 48 bits, one bit each is stored from code [0] to code [47]. A step S405 substitutes the information in the arrangement code [ ] into a variable bit in the following manner:

$$\text{bit=code } [INT(i/M) \times W + INT(j/N)] \quad (3)$$

Then a step S406 discriminates whether the substituted variable bit is "1". As the information in the arrangement code [ ] is one bit each, the variable bit has a value "0" or "1".

In case the step S406 identifies a value "0", a step S407 sets a quantization condition A, but, in case a value "1" is identified, a step S408 sets a quantization condition B.

Then a step S409 executes a quantization process based on thus set quantization condition. The quantization process corresponds to the error diffusion process explained in relation to FIG. 3.

Then a step S410 steps up the variable j in the horizontal direction, and a step S411 discriminates whether the variable j is smaller than the horizontal pixel number WIDTH of the image. Thus the above-described procedure is repeated until the number of the processed pixels reaches the horizontal pixel number WIDTH.

When the process in the horizontal direction is completed corresponding to the pixel number WIDTH, a step S412 steps up the variable i in the vertical direction, and a step S413 discriminates whether the variable i is smaller than the vertical pixel number HEIGHT. Thus the above-described procedure is repeated until the number of processed pixels reaches the vertical pixel number HEIGHT.

The above-described operation sequence allows to change the quantization condition in the unit of a block consisting of N×M pixels.

In the following there will be explained examples of the quantization conditions A, B, C. The quantization condition in the error diffusion method includes various factors, but that in the first embodiment is assumed to be the quantization threshold value. There may be adopted any quantization threshold value for the quantization condition C, since it is used outside the embedding area for the additional information.

In the aforementioned gradational representation with 8 bits for a pixel and with binary quantization levels, the maximum value "255" and the minimum value "0" become the representative values of quantization, and an intermediate value "128" is often adopted as the quantization threshold value.

More specifically, in the quantization-condition C, the quantization threshold value is fixed at "128". Since the quantization conditions A, B are used in the block inside the embedding area for the additional information, it is necessary to generate a difference in the image quality depending on the difference in the quantization condition. The difference in the image quality has to be represented in a visually not easily recognizable manner and has to be precisely detectable on the paper.

Figure 6A:
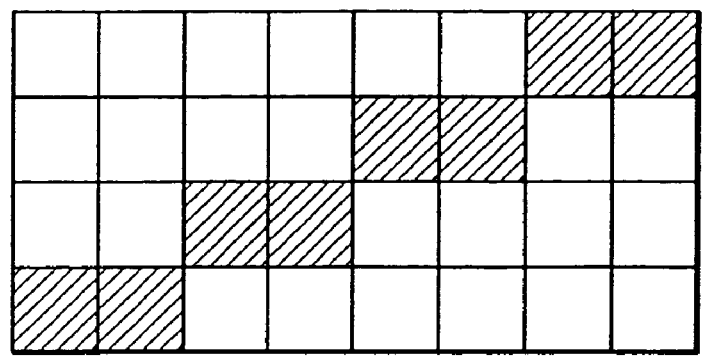
FIGS. 6A and 6B are views showing examples of change of quantizing threshold value in the quantizaing condition.
Figure 6B:
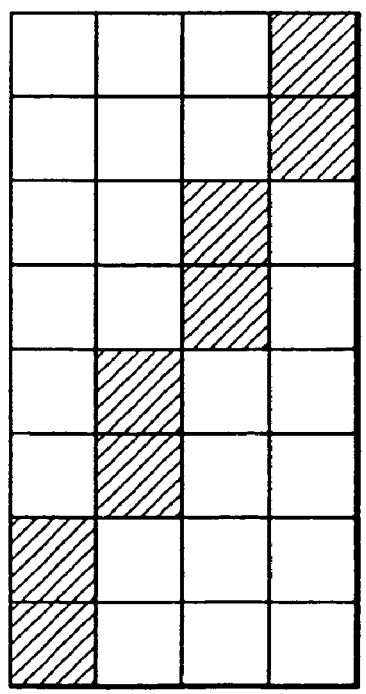

FIGS. 6A and 6B illustrate examples of the quantization conditions A, B. FIG. 6A shows the period of change in the quantization threshold value in the quantization condition A. In FIG. 6A, each square corresponds to a pixel, and a white square indicates a fixed threshold value while a gray square indicates a variable threshold value.

Thus, in the example shown in FIG. 6A, the block consists of a matrix of 8 pixels in the horizontal direction and 4 pixels in the vertical direction, and a steeply different threshold value is set in the gray squares.

FIG. 6B similarly shows the period of change in the quantization threshold value in the quantization condition B. In FIG. 6B, the block consists of a matrix of 4 pixels in the horizontal direction and 8 pixels in the vertical direction, and a steeply different threshold value is set in the gray squares.

In the aforementioned case of gradation levels of 8 bits per pixel, the fixed threshold value is selected as "128" while the steeply different threshold value is selected as "10" as an example. With a lower quantization threshold value, the quantized value of the contemplated pixel more easily assumes a value "1" (quantization representative value "255"). Thus, in the examples shown in FIGS. 6A and 6B, the quantization value "1" tends to appear more frequently in the gray squares.

Stated differently, among the blocks of N×M pixels each, there are mixed the blocks in which the dots are generated with the pattern of the gray squares shown in FIG. 6A and those in which the dots are generated with the pattern of the gray squares shown in FIG. 6B.

In the error diffusion method, the image quality is not significantly affected by a slight change in the quantization threshold value. In the systematic dither method, the image quality in gradational representation is significantly affected by the dither pattern to be employed.

In the error diffusion method involving the periodic change in the quantization threshold value as explained in the foregoing, the gradational representation determining the image quality is after all governed by the error diffusion method, so that the image quality of the gradational representation is scarcely affected by a slight change in the arrangement of dots or by a change in the texture generation.

Even in case of a change in the quantization threshold value, the error corresponding to the difference between the signal value and the quantized value is distributed to the surrounding pixels, so that the entered signal value is macroscopically retained. Stated differently, the error diffusion method has a very large redundancy in the arrangement of dots and in the generation of texture.

In the following there will be given an explanation on the additional information extracting unit 105.

Figure 7:
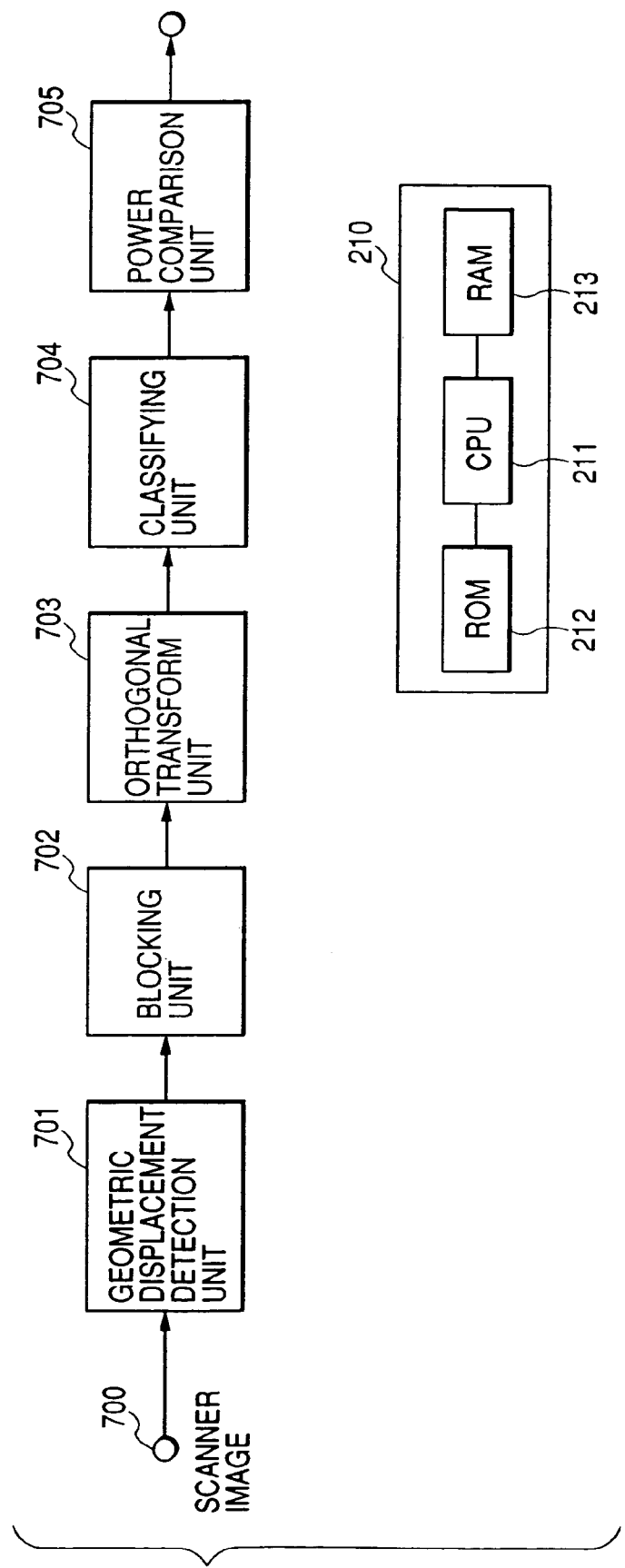
FIG. 7 is a block diagram showing the principal parts of an additional information extracting unit shown in FIG. 1.

FIG. 7 is a block diagram showing the configuration of the additional information extracting unit 105. An input terminal 700 enters the image information read by the scanner. The scanner to be employed preferably has a resolution at least equal to that of the printer employed for preparing the print. In order to exactly read the presence of the dots on the print, the resolution of the scanner has to be at least twice of that of the printer, according to the sampling principle. However, a resolution of the scanner at least equal to that of the printer can identify, even if not exactly, the presence of the dots.

In the first embodiment, for the purpose of ease of explanation, the resolution of the printer is assumed to be equal to that of the scanner.

A geometrical displacement detection unit 701 detects the geometrical displacement of the image entered by the scanner. The image information entered from the input terminal 700, having been subjected to the processes of output by the printer and input by the scanner, may be significantly displaced geometrically from the image information prior to the output by the printer.

Therefore, the geometrical displacement detection unit 701 is provided with a detection unit for detecting four points in the end portion where the image information is assumed to be printed in the print. If the resolution of the printer is same as that of the scanner, the rotation (inclination) of the image, which is caused for example by skewed paper feeding on the printer at the recording operation on paper or by displacement of the print at the setting thereof on the scanner, is a major factor to be corrected. The detection of the four points in the end portion allows to judge the level of displacement in the rotating direction.

A block forming unit 702 forms blocks in the-unit of P×Q pixels. This block has to be smaller than the block of N×M pixels formed at the multiplexing. More specifically there have to be satisfied following relationships:

$$P \leq N, Q \leq M \quad (4)$$

Also the blocks of P×Q pixels each are formed with a skipping of a predetermined interval, in such a manner that a block of P×Q pixels is contained in each area that is assumed to be the block of N×M pixels formed at the multiplexing. The number of pixels for such skipping is basically N pixels in the horizontal direction and M pixels in the vertical direction, but it is necessary to calculate the amount of displacement per block by dividing the displacement amount detected by the geometrical displacement detection unit 701 with the number of blocks and to execute correction by adding such displacement amount per block to the number of pixels of skipping.

Figure 8:
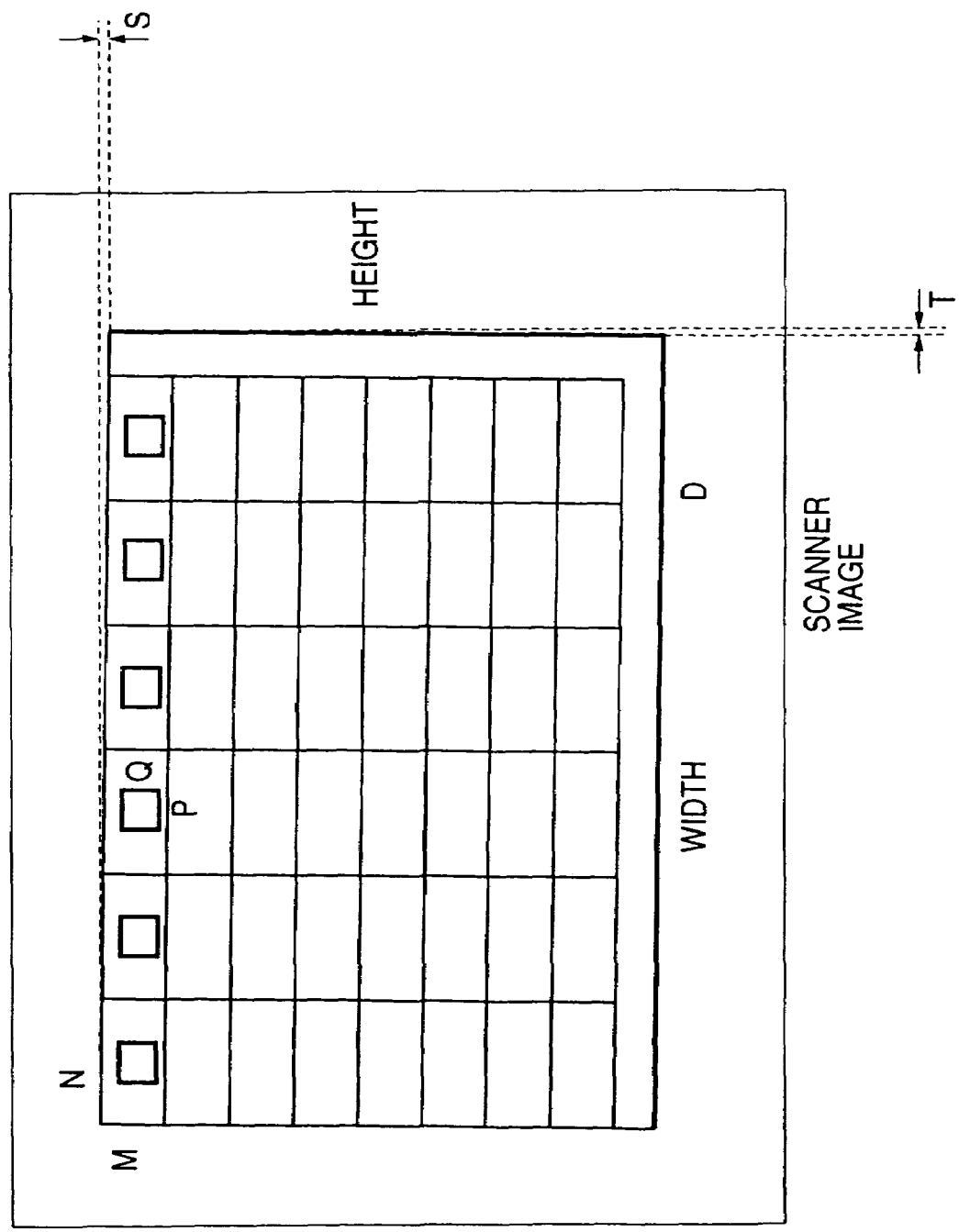
FIG. 8 is a schematic view showing the inclination of an image in the scanner image.

FIG. 8 shows the block formation with the correction for the displacement amount, whether the largest rectangular area indicates the scanner image transmitted from the scanner, and a large inner area D surrounded by thick lines represents an image print area where the image is assumed to be printed. The detection of four end points of the image print area D allows to judge the rotational displacement of the image information.

The detection of the end portion may be achieved by recording a marker, indicating the end portion, in advance at the printing operation or by detecting the difference in density between the white area of the paper and the printed area. Based on the displacement T in the horizontal direction and the displacement S in the vertical direction, the displacement amount (T', S') per block can be calculated as follows:

$$T' = T \times M/\text{HEIGHT} \quad (5)$$
$$S' = S \times N/\text{WIDTH} \quad (6)$$

A smaller rectangular area surrounded by thick lines indicates a block formed with P×Q pixels. For the simplicity of explanation, the formed blocks are shown only in the upper first row. By the block formation corrected according to the equations (5) and (6), the start position of each block is so controlled that a block of P×Q pixels is contained in an area which is assumed to the block of N×M pixels formed at the multiplexing.

An orthogonal transformation unit 703 executes orthogonal transformation on the P×Q pixels formed as a block. However, for executing two-dimensional orthogonal transformation, the blocks have to be formed with square blocks where Q=P. In the first embodiment, DCT (discrete cosine transformation) is adopted as an example.

The two-dimensional DCT coefficients for a block of P×P pixels are given by:

$$C(x) = 1/\sqrt{2} \quad (x = 0)$$
$$C(x) = 1 \quad (x \neq 0) \quad (7)$$

A classification unit 704 executes classification by the band of the orthogonal transformation coefficients.

Figure 9:
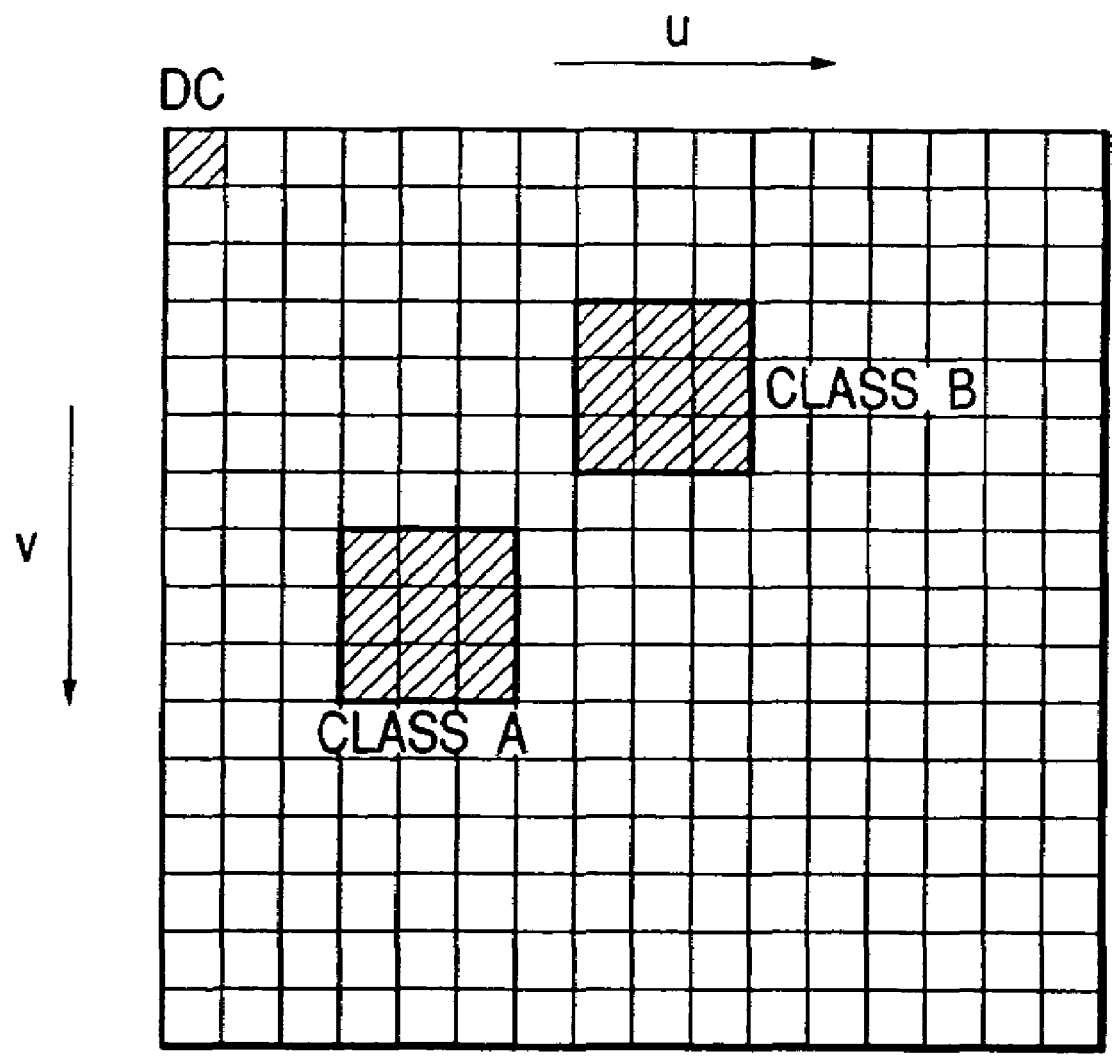
FIG. 9 is a view showing an example of classification in the orthogonally transformed blocks.

FIG. 9, showing an example of classification where P=Q=16, represents the orthogonal transformation coefficients F(u, v) in a block, wherein the upper left corner square corresponds to the DC component and the remaining 255 squares correspond to the AC components.

As an example, there are formed two classes, namely a class A centered at F(8, 4) and a class B centered at F(4, 8). These two classes are indicated by thick lines. The classification unit-need not classify all the 256 components but is only required to classify into plural classes having centers at the desired components. The number of required classes correspond to the number of conditions for quantization control at the multiplexing. Stated differently, the number of classes does not become larger than the number of conditions for quantization control.

A power comparison unit 705 compares the sum of the electric power of the classes. For achieving faster calculation, the electric power may be replaced by the absolute value of the generated transformation coefficient. The signal of the additional information is discriminated by comparing the sum of the electric power of the classes. In the following there will be explained, as an example, a case of applying the quantization conditions A, B shown in FIGS. 6A and 6B at the embedding of the additional information. In the quantization with the conditions A, B, as explained in the foregoing, there tends to be generated a texture in which the dots are arranged in oblique directions of different angles. Thus, in a block quantized with the quantization condition A, a large power is generated in the class A shown in FIG. 9 after the orthogonal transformation process.

On the other hand, in a block quantized with the condition B, a large power is generated in the class B in FIG. 9 after the orthogonal transformation. Thus, the relative comparison of the magnitude of powers of the classes A and B allows whether the quantization condition A or B is employed in multiplexing the concerned block. Since the quantization condition is related to the sign (bit in the equation (3)) of the additional information, the identification of the quantization condition allows to specify the sign of multiplexing.

In the example of the flow chart shown in FIG. 4, bit=0 and bit=1 are respectively assigned to the quantization conditions A and B. Therefore, bit=0 can be identified if the power of the class A is larger, while bit=1 can be identified if the power of the class B is larger.

In the quantization by the error diffusion method, the filter itself of the error diffusion method has the characteristics of a high-pass filter for passing the high frequency range. Therefore, the power of the low to medium frequency range such as the classes A and B decreases in the transformation coefficients after the ordinary quantization, whereby the aforementioned discrimination is rendered possible.

If the power of such low to medium frequency range is relatively large, there can be assumed a situation where a large electric power is generated by an artificial control of the quantization condition. Stated differently, by changing the regularity of the changing period of the quantization condition, it is possible to generate a large power in desired manner with scarcely noticeable change in the image.

In the first embodiment, there has been explained a case where the quantization condition at the multiplexing is controlled in two manners, namely the quantization conditions A and B, and the classification at the extraction is in two manners, namely the classes A and B. Such situation corresponds to a case where the additional information in the block consists of 1 bit, but it is naturally possible to control the quantization condition in a larger number of manners and to execute classification in a larger number of classes. (The quantization condition C is excluded since it is applied outside the area of embedding the additional information.)

In the first embodiment, it is not necessary to embed the information by orthogonal transformation at the multiplexing as in the conventional art. A deviation in the frequency after the quantization is generated by a mere change in the quantization condition. Besides, since the deviation in the frequency is mixed in the high frequency components generated in the error diffusion method, such deviation is visually not easily recognizable. Also the precision of extraction becomes very high because the multiplexing is executed at the quantization step which is immediately prior to the transmission to the printer.

In the first embodiment explained in the foregoing, the image in the form of blocks becomes more inclined as the geometrical displacement increases, so that the frequency becomes displaced from the desired value. For example, even if the multiplexing is so executed as to generate a large electric power at F(4, 8), the generated frequency becomes displaced from F(4, 8) as the image is inclined. For this reason, there can be conceived a configuration in which the configuration of the classes is dynamically changed-according to the amount of geometrical displacement. Naturally there may be adopted only one classification if the displacement amount is limited.

Also the quantization conditions A, B, C and the classes A, B in the classification are merely an example and the present invention is not limited to such example. There may be adopted another regularity, or there may be employed any arrangement of the steeply different quantization threshold value. Also the quantization condition may be changed with a variable cycle in the vertical and/or horizontal direction by means of a counter or with a quantization threshold value table in which the regularity is selected in advance.

Also the quantization has been explained by binarization as an example, but the present invention is not limited to such example.

Also the method of orthogonal transformation has been explained by DCT, but the present invention is not limited to such example, and there may be adopted other orthogonal transformations such as Hadamard transformation, Fourrier transformation or wavelet transformation.

In the first embodiment, as explained in the foregoing, the quantization condition is changed in the unit of a block of M×N pixels formed by dividing the image, and the information is embedded into the image by quantizing the image according to such quantization condition. Therefore, in comparison with the conventional method of information embedding by orthogonal transformation, it is rendered possible to embed the information into the image so as to suppress the deterioration in the image quality and to enable precise extraction of the embedded information.

Also the embedded information can be extracted by executing orthogonal transformation in the unit of a block of P×Q pixels formed by dividing the image, classifying the transformation coefficients of such orthogonal transformation into plural classes and comparing the electric powers of such classes. Therefore the embedded information can be extracted in more precise manner in comparison with the conventional method in which the coefficients of transformation are not classified into plural classes.

Figure 10:
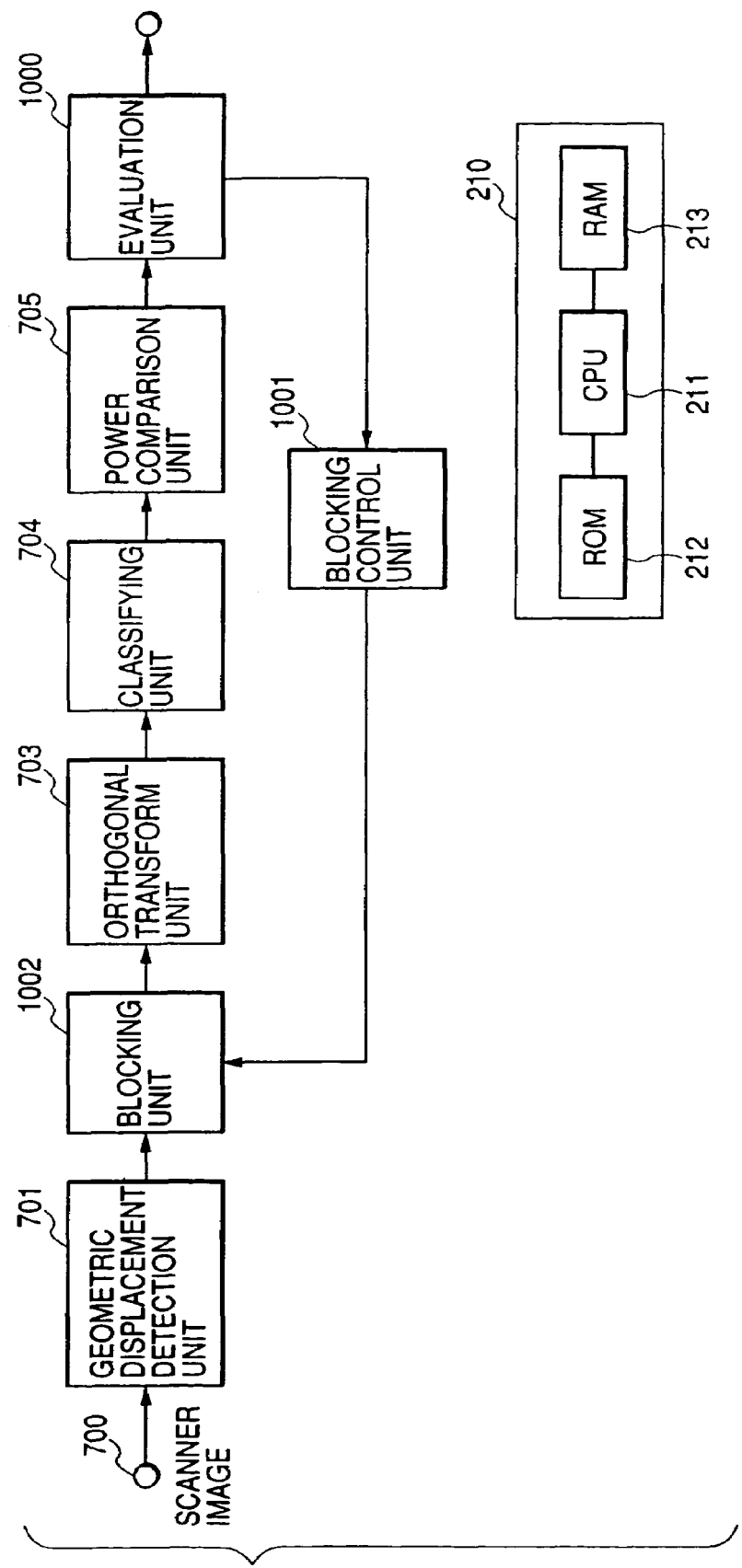
FIG. 10 is a block diagram showing the principal parts of a second embodiment of the additional information separating unit of the present invention.

FIG. 10 is a block diagram showing the configuration of an additional information extracting unit in a second embodiment.

As the configuration shown in FIG. 10 is only partly different from that shown in FIG. 7, the corresponding components are represented by corresponding symbols and the following explanation will be given only on the different points.

Referring to FIG. 10, an evaluation unit 1000 evaluates the result of comparison from a power comparison unit 705. There is evaluated the accuracy of discrimination by the relative comparison of the classes, by comparing the difference G of the powers of the classes and a predetermined threshold value TH. In case there are three or more classes, the difference in power between the class of the largest power and that of the second largest power is assumed as G.

Stated differently, there is discriminated whether a class of a steeply different power level is present in the block of P×Q pixels, by introducing an evaluation function G. Such class of the steeply different power level may not be generated by various conditions, such as the state of the image information, the precision of dot placement at the printer output, the reading precision of the scanner etc. If a class of the largest value is selected in a situation where the class of a steeply different power level is absent, the sign of the additional information may be erroneously judged. Therefore, the evaluation unit 1000 determines the sign of the additional information according to the quantization condition of the class with the largest power, if the difference G in the power of the classes is equal to or larger than the predetermined threshold value TH.

If the difference G is smaller than the threshold value TH, the reliability is judged low and such information is supplied to a block formation control unit 1001, which controls the conditions of block formation. In the second embodiment, it changes the position of block formation. The block formation control unit 1001 determines the amount of change, and a block formation unit 1002 executes block formation again, employing the changed position as the original point.

Figure 11A:
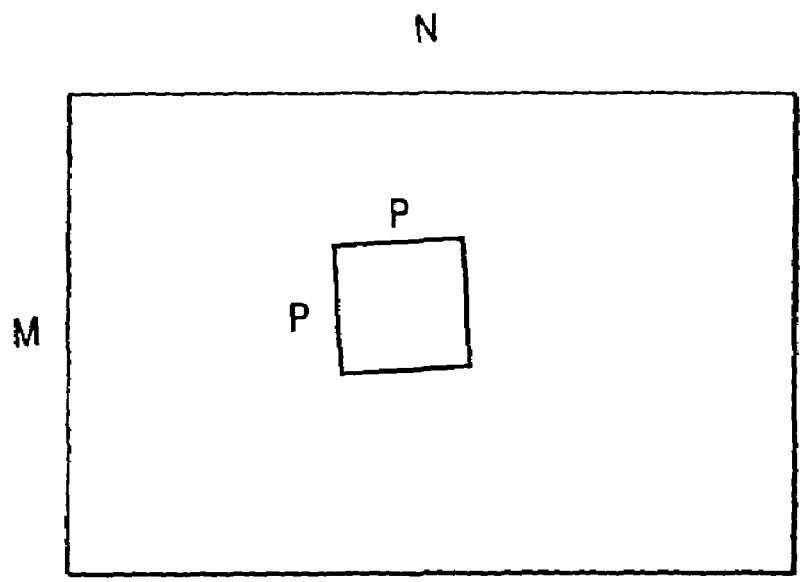
FIGS. 11A, 11B, 12A and 12B are views showing examples of block reformation by a block formation control unit shown in FIG. 10.
Figure 11B:
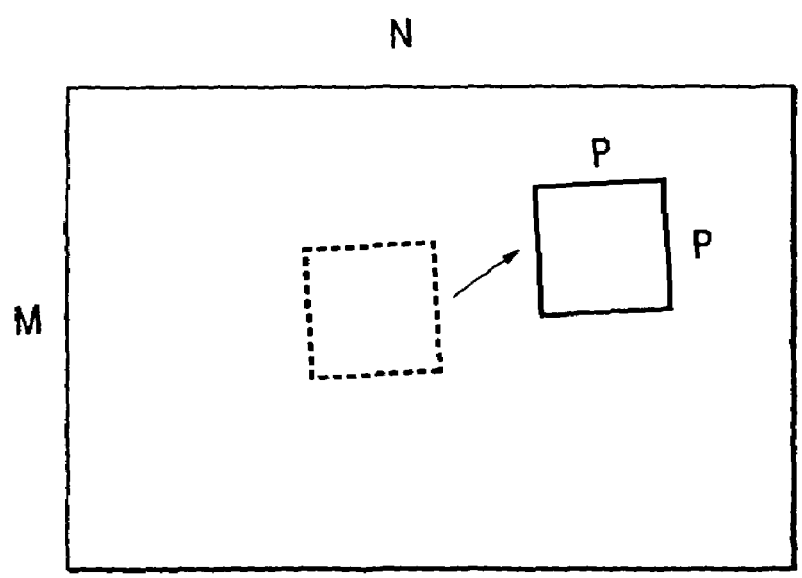

FIGS. 11A and 11B show the mode of such change. FIG. 11A shows a block formed first time, and FIG. 11B shows a block formed second time. In FIG. 11B, a broken-lined block indicates the position of the block formed first time.

A larger inclined rectangle indicates an assumed block consisting of N×M pixels. The block formation control unit 1001 has to control the amount of change so as not to overflow from such assumed block.

After the repeated block formation, the process is executed again as in the first time to calculate the difference G in the electric power, which is then subjected to comparison with the threshold value TH. If a class with a steeply different power level is generated by the repeated block formation, the sign of the additional information is determined based on such result. If a class with such steeply different power level is absent again, the class with the largest power is adopted if it is same as in the first cycle.

If the class with the largest power after the repeated block formation is different from that in the first cycle, there is adopted the class showing the large power difference G in the first or second cycle. Such discriminations repeated plural times allow to reduce the rate of erroneous judgment for the extracted additional information.

Figure 12A:
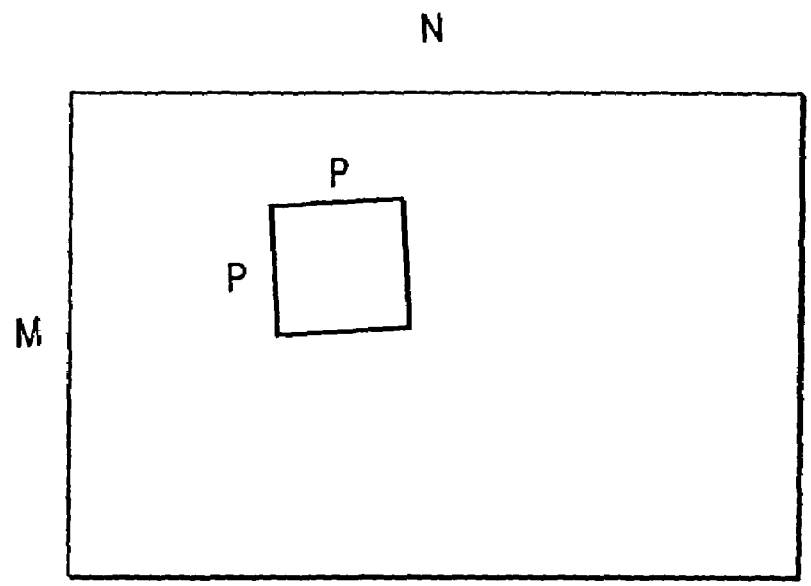
Figure 12B:
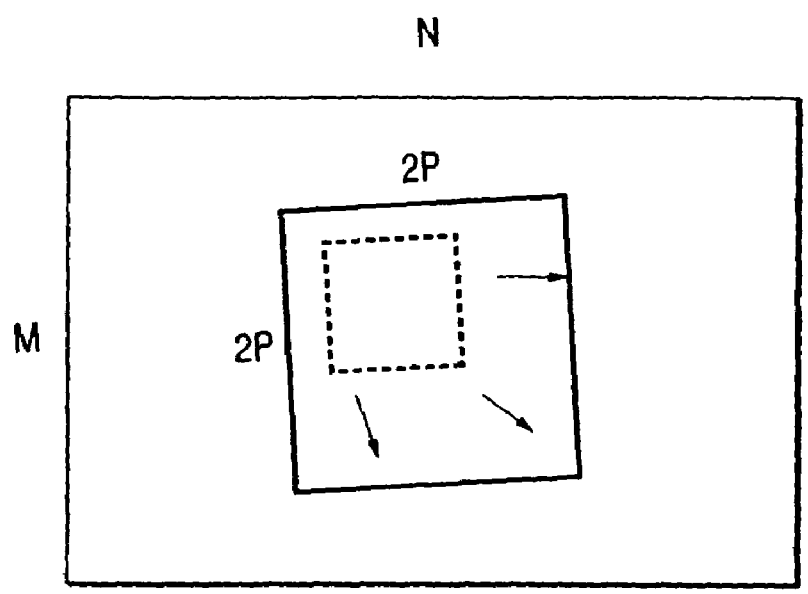
Figure 13:
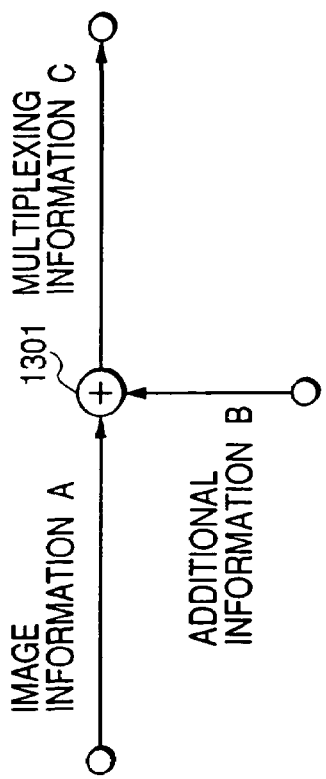
FIGS. 13, 14 and 15 are block diagrams showing examples of conventional multiplexing.
Figure 14:
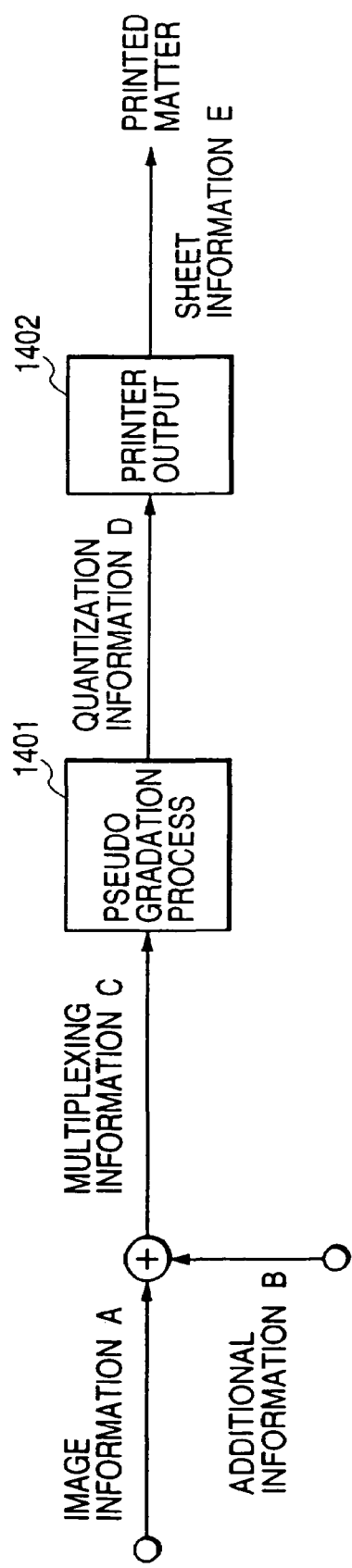
Figure 15:
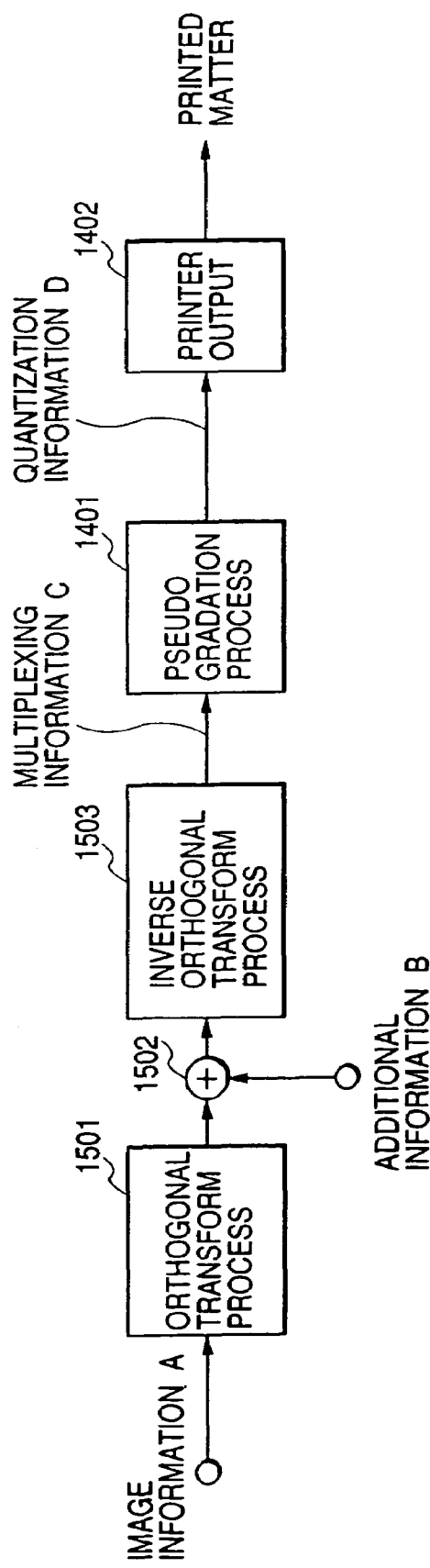
Figure 16:
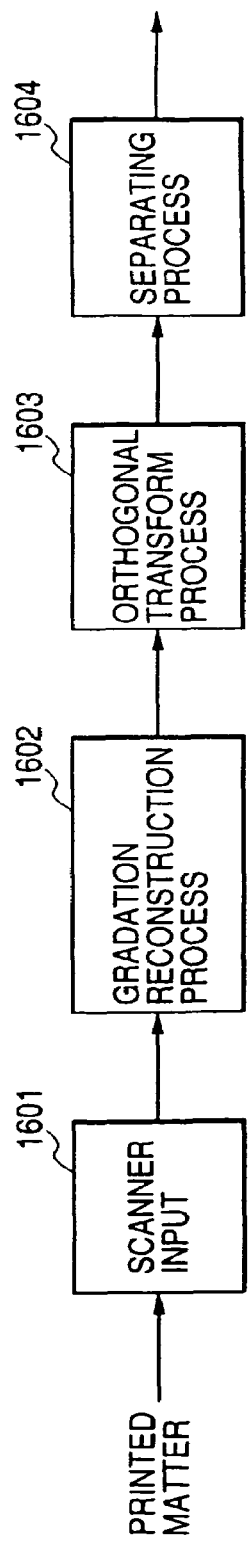
FIG. 16 is a block diagram showing an example of conventional extraction.

FIGS. 12A and 12B show a mode of repeated block formation, different from that shown in FIGS. 11A and 11B. FIG. 12A shows the block formation in the first cycle, while FIG. 12B shows the block formation in the second cycle. As in FIG. 11B, a solid-lined rectangle indicates a block formed again, and a broken-lined rectangle indicates a block formed first time. In this example, the size of the block is changed at the repeated block formation.

More specifically, the block formation first time is executed with P×P pixels, while the block re-formation is executed with an increased size of 2P×2P pixels. A class of a steeply different power level is more easily generated in the orthogonal transformation on 2P×2P pixels than on P×P pixels. In such case, the classification naturally has to be changed according to the block size.

For example, a class having the center at F(4, 8) at the block formation in the unit of P×P pixels is changed, in case of block formation in the unit of 2P×2P pixels, to a class having the center at F(8, 16). Also in such case, the block re-formation has to be so controlled as not to overflow from the assumed block of N×M pixels.

In the example shown in FIGS. 12A and 12B, the priority is preferably given to the discrimination based on the block formation of the second time rather than that of the first time. Thus there is adopted the class having the largest value in the block re-formation, regardless whether a class of a steeply different level is generated in the block re-formation.

In the foregoing there has been explained a case of executing the block formation of the first time with a unit of P×P pixels and that of the second time with a unit of 2P×2P pixels, but the increase in size is not limited to such example. In general, in case the block formation of the first time is executed with the unit of P×Q pixels, it is effective to execute the block re-formation with the unit of K×L pixels (P<K or Q<L).

In the foregoing there has been explained the discrimination method by block re-formation, but such method is not restrictive. It is also possible to repeat the block re-formation twice or more, or to execute plural block formations from the first time and to comprehensively judge the results in the block.

In the foregoing there has been explained each of the additional information multiplexing-unit and the additional information extracting unit, but the second embodiment is not limited to the combination of these two units.

As explained in the foregoing, the second embodiment utilizes an evaluation unit for comparing the difference between the classes in the power with a threshold value, and, in case the difference is equal to or less than the threshold value, executes the block formation again with a change in the position or size of the block, thereby enabling precise extraction of the embedded information.

In the foregoing second embodiment, there has been explained a method of extracting, from the image information, the embedded information which is embedded therein by applying a pseudo gradation process utilizing the error diffusion method on the image information, but the embedding method for the information to be extracted is not limited to the error diffusion method. For example, the information may be embedded for example by a pseudo gradation process utilizing the dither method.

The present invention may be applied to a system consisting of plural equipment (for example host computer, interface devices, reader, printer etc.) or an apparatus consisting of a single equipment (such as a copying machine or a facsimile apparatus), within an extent that the functions of the foregoing embodiments can be realized.

Also the present invention includes a case where the program codes of a software realizing the functions of the aforementioned embodiments are supplied to a computer of a system or an apparatus connected to various devices in order to operate the device so as to realize the functions of the aforementioned embodiments and the functions of the aforementioned embodiments are realized by operating the devices by the computer (CPU or MPU) of the abovementioned system or apparatus according to the program codes.

In such case the program codes themselves of the software realize the functions of the aforementioned embodiments, and the program codes themselves and the means for supplying the computer with such program codes, for example a memory medium storing the program codes, constitutes the present invention.

The memory medium storing such program codes can be, for example, a floppy disk, a hard disk, an optical disk, a magnetooptical disk, a CD-ROM, a magnetic tape, a nonvolatile memory card or a ROM.

The present invention also includes such program codes not only a case where the functions of the aforementioned embodiments are realized by the execution of the read program codes by the computer but also a case where an operating system or the like functioning on the computer executes all or a part of the actual processes under the control of such program codes thereby realizing the functions of the aforementioned embodiments.

The present invention further includes a case wherein the supplied program codes are once stored in a memory provided in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

As explained in the foregoing, in adding predetermined information to an image, the present invention divides the image into plural image areas, then quantizes the image area by the error diffusion method and controls the quantization condition for such quantization in the unit of the image area, thereby suppressing the deterioration in the image quality resulting from the addition of the predetermined information to the image and enabling to embed the predetermined information in the image in such a manner that such embedded information can be precisely extracted.

Also in extracting predetermined information from an image in which the predetermined information is added, the present invention divides the image into plural image areas, then executes orthogonal transformation on the image areas, classifies the image areas into plural classes based on the orthogonal transformation and extracts the predetermined information based on a feature amount of each class thus classified, thereby enabling to precisely extract the predetermined information from the image to which such predetermined information is added.

What is claimed is:

1. An image processing apparatus which embeds additional information in an image, the apparatus comprising:
    input means for inputting the image; and
    quantization means for quantizing the image input by said input means, utilizing an error diffusion method,
    wherein said quantization means embeds the additional information by using a threshold different from a threshold used when not embedding additional information in a partial area in the inputted image, and
    said quantization means periodically arranges the area which use the threshold different from the threshold used when not embedding the additional information, and
    said quantization means embeds the additional information by changing a combination of the horizontal period and the vertical period used when arranging the areas.

2. An image processing apparatus according to claim 1, wherein said predetermined information is audio information.

3. An image processing apparatus according to claim 1, wherein said predetermined information is information relating to a copyright of the image.

4. An image processing apparatus according to claim 1, wherein said predetermined information is added to the image in such a manner not easily visible to a human eye.

5. An image processing apparatus which extracts additional information from an image in which additional information has been embedded, the apparatus comprising:
    input means for inputting the image;
    transformation means for executing frequency transformation on the image;
    classification means for classifying the image into plural classes based on the transformation process of said transformation means;
    calculation means for calculating a feature amount of each class based on a conversion coefficient of the classified class;
    comparison means for relatively comparing sizes of the feature amounts of the calculated classes; and
    extracting means for extracting the additional information based on a comparison result.

6. An image processing apparatus according to claim 5, wherein said frequency transformation is an orthogonal transformation.

7. An image processing apparatus according to claim 5, further comprising:
    evaluation means for evaluating a result of evaluation; and
    re-division means for executing again the division process of said division means, based on the result of evaluation by said evaluation means.

8. An image processing apparatus according to claim 7, wherein said re-division means executes division again by changing the dividing position of the division.

9. An image processing apparatus according to claim 7, wherein said re-division means executes division again by changing a size of division.

10. An image processing apparatus according to claim 5, wherein said feature amount is an absolute value of coefficients of transformation by said transformation means.

11. An image processing apparatus according to claim 5, wherein said feature amount is electric power.

12. An image processing apparatus according to claim 5, wherein said predetermined information is audio information.

13. An image processing apparatus according to claim 5, wherein said predetermined information is information relating to copyright of the image.

14. An image processing apparatus according to claim 5, wherein said predetermined information is added to the image in such a manner not easily visible to human eyes.

15. An image processing method capable of embedding additional information in an image, the method comprising:
    an input step of inputting the image; and
    a quantization step of quantizing the image input in said input step, utilizing an error diffusion method,
    wherein said quantization step embeds the additional information by using a threshold different from a threshold used in case when not embedding the additional information in a partial area in the inputted image, and
    said quantization step periodically arranges the areas to which use the threshold different from the threshold used when not embedding the additional information, and
    said quantization step embeds the additional information by changing a combination of the horizontal period and the vertical period used when arranging the areas.

16. An image processing method according to claim 15, wherein said predetermined information is audio information.

17. An image processing method according to claim 15, wherein said predetermined information is information relating to a copyright of the image.

18. An image processing method according to claim 15, wherein said predetermined information is added to the image in such a manner not easily visible to human eyes.

19. An image processing method which is capable of extracting additional information from an image in which additional information has been embedded, the method comprising:

an input step of inputting the image;

a division step of dividing the entered image into plural image areas;

a transformation step of executing frequency transformation on the image;

a classification step of classifying the image into plural classes based on the transformation process of said information step;

a calculation step of calculating a feature amount of each class based on a conversion coefficient of the classified class;

a comparison step of relatively comparing sizes of the feature amounts of the calculated classes, and an extraction step of extracting the additional information based on a comparison result.

20. An image processing method according to claim 19, wherein said frequency transformation is an orthogonal transformation.

21. An image processing method according to claim 19, further comprising:

an evaluation step of evaluating a result of evaluation; and a re-division means for executing again the division process of said division step, based on the result of evaluation by said evaluation step.

22. An image processing method according to claim 21, wherein said re-division step executes division again by changing the dividing position of the division.

23. An image processing method according to claim 21, wherein said re-division step executes division again by changing the size of division.

24. An image processing method according to claim 19, wherein said feature amount is an absolute value of the coefficients of transformation by said transformation step.

25. An image processing method according to claim 19, wherein said feature amount is electric power.

26. An image processing method according to claim 19, wherein said predetermined information is audio information.

27. An image processing method according to claim 19, wherein said predetermined information is information relating to copyright of the image.

28. An image processing method according to claim 19, wherein said predetermined information is added to the image in such a manner not easily visible to human eyes.

29. A computer readable memory medium which stores program codes for embedding additional information in an image, the program codes comprising:

a code for inputting the image; and a code for quantizing the image input by said input step, utilizing an error diffusion method, wherein said quantizing step embeds the additional information by using a threshold different from a threshold used when not embedding the additional information in a partial area in the inputted image, and said quantizing step periodically arranges the areas which use the threshold different from the threshold used when embedding the additional information, and said quantizing step embeds the additional information by changing a combination of the horizontal period and the vertical period used when arranging the areas.

30. A computer readable memory medium which stores program codes for extracting additional information from an image in which additional information has been embedded, the program codes further comprising:

a code for inputting said image;

a code for executing frequency transformation on the image;

a code for classifying said image into plural classes based on the transformation process of said transformation means;

a code for calculating a feature amount of each class based on a conversion coefficient of the classified class;

a code for relatively comparing sizes of the feature amounts of the calculated classes; and a code for extracting the additional information based on a comparison result.

* * * * *

UNITED STATES PATENT AND TRADEMARK OFFICE
CERTIFICATE OF CORRECTION

| | |
|---|---|
| PATENT NO. | : 7,058,232 B1 |
| APPLICATION NO. | : 09/711956 |
| DATED | : June 6, 2006 |
| INVENTOR(S) | : Nobutaka Miyake |

It is certified that error appears in the above-identified patent and that said Letters Patent is hereby corrected as shown below:

TITLE PAGE AT ITEM [56]:
Foreign Patent Documents, "06 231466" should read --6-231466--; and "11 041416" should read --11-41416--.

COLUMN 2:
Line 42, "to" should be deleted.

COLUMN 3:
Line 67, "No. 2,833,975," should read --No. 2833975,--.

COLUMN 6:
Line 13, "level" should read --levels--.
Line 35, "Stainberg" should read --Steinberg--.

COLUMN 7:
Line 2, "explained is" should read --is explained--.
Line 28, "arrange" should read --arranged--.

COLUMN 9:
Line 30, "of" should be deleted.

COLUMN 10:
Line 61, "unit-need" should read --unit need--.
Line 64, "correspond" should read --corresponds--.

COLUMN 14:
Line 18, "multiplexing-unit" should read --multiplexing unit--.

UNITED STATES PATENT AND TRADEMARK OFFICE
CERTIFICATE OF CORRECTION

PATENT NO. : 7,058,232 B1
APPLICATION NO. : 09/711956
DATED : June 6, 2006
INVENTOR(S) : Nobutaka Miyake It is certified that error appears in the above-identified patent and that said Letters Patent is hereby corrected as shown below:

COLUMN 15:
Line 44, "use" should read --uses--.

Signed and Sealed this

Second Day of January, 2007

JON W. DUDAS
*Director of the United States Patent and Trademark Office*